Oct. 23, 1945.   H. T. NAGAMATSU   2,387,527
CARGO AIRPLANE
Filed May 19, 1943
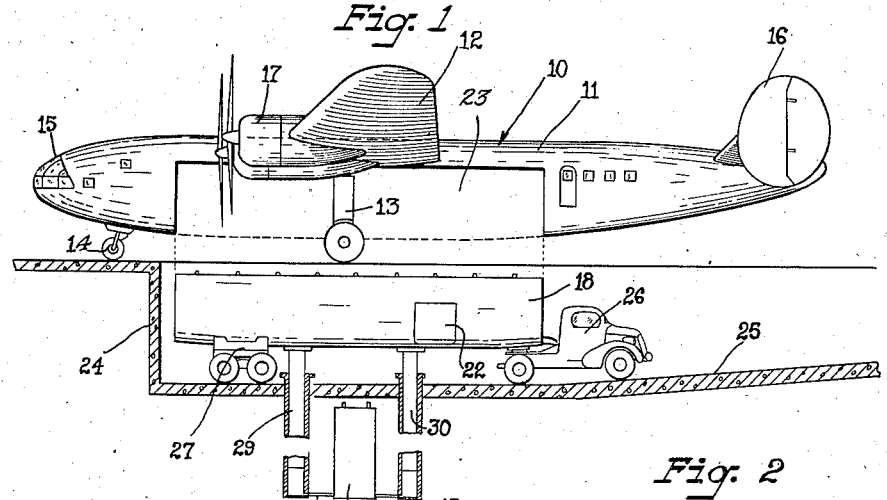
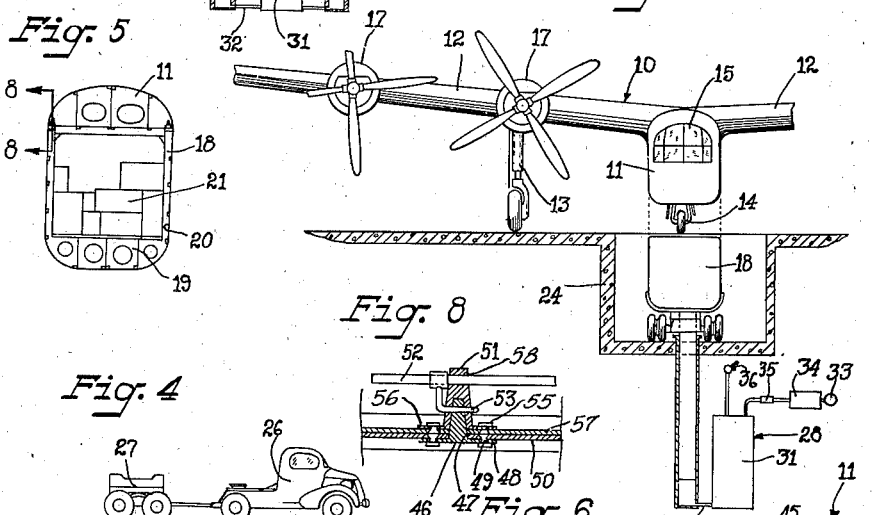
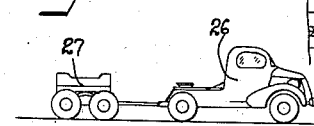
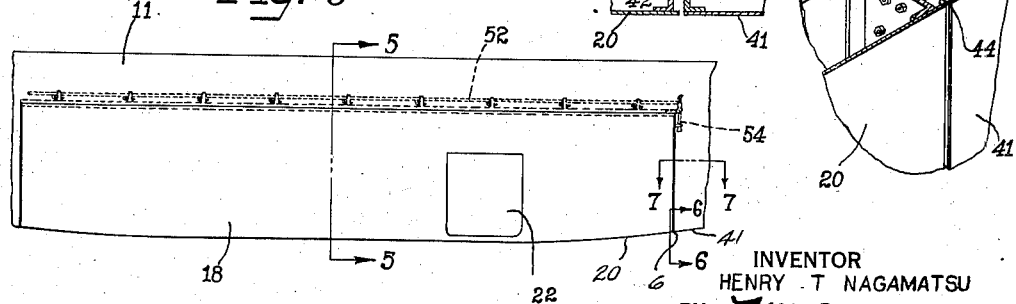
INVENTOR
HENRY T NAGAMATSU
BY
ATTORNEY Patented Oct. 23, 1945

2,387,527

UNITED STATES PATENT OFFICE 2,387,527

CARGO AIRPLANE

Henry T. Nagamatsu, Cheektowaga, N. Y., assignor to Curtiss-Wright Corporation, a corporation of Delaware Application May 19, 1943, Serial No. 487,836

4 Claims. (Cl. 244—118)

This invention relates to cargo airplanes and more particularly to means for loading and unloading the same.

The ordinary airplane such as now used for transporting the cargo is nothing more than a makeshift passenger airplane, and requires that the same be loaded through door openings of the airplane at the airport. Considerable time is consumed in arranging the load within the airplane, thereby keeping the airplane on the ground and out of operation longer than it should be if maximum efficiency is to be had of a transportation system based on the use of airplanes.

It is an object of the present invention to provide a cargo airplane in which goods may be loaded into a separable load-carrying body or container at its source, be transferred to the airplane, flown with the airplane, separated from the airplane, and finally delivered in the same container at the destination of the goods remote from the base airport.

It is another object of the invention to so construct an airplane that a portion of the same containing the cargo may be separated from it, and yet leave the airplane strong enough to be taxied over the ground.

It is another object of the invention to provide a cargo airplane having a separable load-carrying body of stress-receiving construction so that upon the same being fitted into a recess in the airplane, it becomes an integral part thereof to receive and transmit the stresses set up within the airplane.

It is still another object of the invention to provide an improved system for the handling of the cargo.

According to the present invention, the airplane fuselage is provided with an enlarged recess in its bottom, into which can be fitted a load or cargo-carrying body which is of such construction as to receive and transmit the stresses set up within the airplane during flight. The cargo-carrying body and the fuselage along their matching edges are provided with cooperating fastening devices adapted to be automatically coupled together upon the cargo body being hoisted into the recess. A latch common to all the devices along the top edges of the cargo body and the recess serves to finally lock the cargo body into the recess and against vertical displacement. Hoisting equipment is provided for raising and lowering the cargo-carrying body to and from the airplane and out of or into a pit in which there is located a vehicle for transporting the cargo body to its loading or unloading station at some location remote from the airport.

For other objects and for a better understanding of the invention, reference may be had to the following detailed description taken in connection with the accompanying drawing, in which Fig. 1 is a side view of the airplane with the cargo-carrying body removed and located in the loading pit on its vehicle carrier.

Fig. 2 is a front elevational view of a portion of the airplane and of a section through the loading pit.

Fig. 3 is an enlarged side elevational view of a portion of the airplane, showing the manner in which the cargo-carrying body is releasably secured to the airplane.

Fig. 4 is a side elevational view of the vehicle carrier.

Fig. 5 is a cross-sectional view through the airplane and the cargo-carrying body and taken along the line 5—5 of Fig. 3.

Fig. 6 is an enlarged cross-sectional view, taken in the region 6 of Fig. 3, illustrating the manner in which the bottom portion of the cargo-carrying body is connected to the bottom of the airplane, as taken along the line 6—6 of Fig. 3.

Fig. 7 is an enlarged perspective view illustrating the securing parts for the connecting of the ends of the cargo-carrying body with the side walls for the fuselage and taken in the region 7—7 of Fig. 3.

Fig. 8 is an enlarged sectional view taken along the line 8—8 of Fig. 5 and showing one of the fastening devices such as used at the top of the cargo body.

Referring now particularly to Figs. 1, 2, and 3, there is shown a high wing airplane 10 having a fuselage 11 and wings 12 secured thereto. Secured to each of the wings 12 is a main landing gear 13 and to the forward end of the fuselage there is connected a nose wheel landing gear 14. Within the fuselage body and intermediate of the two main landing gears 13, there is cut a large recess 23 extending nearly one-half the length of the fuselage. The usual pilot's cabin 15 and the tail surfaces 16 are provided respectively on the forward and rearward ends of the fuselage. Propelling devices 17 are provided on the wings 12.

Adapted to fit into the recess and insertable from underneath the airplane, is a load- or cargo-carrying body 18. As viewed in Fig. 5, it will be noted that this cargo-carrying body has ribs or bulkheads 19, the same as the ordinary fuselage has, with a skin 20 over the same, and that the entire construction is of such size and shape that when it is located in the recess it lies wholly within the contour of the fuselage. The cargo or goods 21 is loaded into the cargo-carrying body 18 through a door 22 in the side wall thereof. There may also be doors located in the ends of the cargo-carrying body 18 in order to provide access to the cargo-carrying body from the fuselage.

In order to remove the cargo-carrying body 18 so as to be entirely free of the fuselage 11 and to permit movement of the airplane away from the same, there is provided a pit 24 having a runway 25 over which a vehicle carrier can travel. The vehicle carrier is of the usual automotive tractor-trailer type with its tractor 26 adapted to be positioned under a rearward portion of the cargo-carrying body 18 and with its trailer 27 adjustable to be located under the forward portion of the cargo body. With the cargo-carrying body lowered into position onto the tractor and the trailer, the same can be moved out of the pit in the same manner that any trailer truck could be moved out of the same.

Located in the bottom of the pit is hoisting equipment 28 including two longitudinally spaced jacks 29 and 30 of sufficient length to extend the cargo-carrying body upwardly into the fuselage and to support the same upon being released from the fuselage. As the jacks are lowered and with the tractor 26 and its trailer 27 properly located in the pit, the cargo-carrying body will be lowered onto the same. The jacks 29 and 30 may be operated in any of the known ways of supplying pressure to heavy hoisting jacks of this type. One such arrangement is shown in Figs. 1 and 2 and contains an oil reservoir 31 in communication with the jacks by means of pipes 32. An air compressor 33 and air chamber 34 is arranged to supply air through a check valve 35 and under pressure to the top of the oil in the oil reservoir 31. As the air pressure builds up within the reservoir 31, oil is forced through the pipes 32 to the jacks 29 and 30. To lower the jacks, a valve controlled air vent 36 is operated to relieve the oil reservoir 31 of its air.

Referring now particularly to Fig. 6, there is shown a fastening device for tying together the bottom portions of the cargo-carrying body and of the fuselage. The bottom portion of the cargo-carrying body includes a transversely extending channel rib 37 disposed between a floor 38 and the outer skin 20 while the bottom portion of the fuselage has a transverse channel rib 39 disposed between a floor 40 and an outer skin 41. On the outer faces of the channels 37 and 39, there are provided respectively transversely extending strips 42 and 43 adapted to overlap and abut firmly against one another. These strips are secured to the face of the channels and are so arranged that they are automatically hooked together as the cargo-carrying body is brought up into place. Through the skins 20 and 41 and the strips 42 and 43, any compression stresses along the bottom portions of the fuselage and of the cargo-carrying body are transmitted.

Extending vertically on the ends of the cargo-carrying body are slide ways or guides 44 into which may be slid a fastener 45 of T-shape section carried by the side wall of the fuselage. These two parts are fitted endwise to one another and are brought into complete engagement by the final sliding of the cargo-carrying body into the recess 23.

Referring now to Fig. 8, in order to maintain the cargo-carrying body in its vertically raised position, there is provided on the top portions of the same, at longitudinally spaced locations thereon, a series of flanged pins 46 thrust through openings 47 in the top covering 50 of the cargo-carrying body and retained in this position by rivets 49 passing through the top covering 50 and the flanged portions 48 of the pins 46. These pins 46 are tapered and arranged to fit respectively in flanged sockets 51 connected to the fuselage 11 by rivets 55 passing through flanged portions 56 of socket 51 and through horizontal boundary wall 57 of recess 23. The sockets 51 carry a rod 52 passing through an opening 58 in socket 51 and mounted for slidable movement therein (i. e. to the right and to the left in Fig. 8). The rod 52 is provided with a plurality of longitudinally extending locking pins 53 each adapted to enter aligned openings in one of the sockets 51 and its associated pin 46 to positively lock the two in place. Once this rod 52 is reciprocated so as to secure the pin and socket together, the cargo body is rigidly suspended within the fuselage 11. At the rearward end of the recess, there is a hand lever 54 by which the rod 52 may be slidably moved.

It should now be apparent that the cargo-carrying body 20 is of such construction and so arranged to be connected into the fuselage 11 that any stresses set up within either the body or the fuselage can be transmitted from one to the other. In other words, the cargo-carrying body becomes virtually a part of the airplane. It should also be noted that the contour of the cargo-carrying body, when in assembled position with the fuselage, is such as to lie within the contour of the fuselage 11. At the same time, it is seen that the cargo-carrying body can be easily transported by the tractor and its trailer over the ground, that is resembles the trailer body of the present day trailer trucks, and that it can be handled with equal facility.

It should also be apparent that there has been provided a system of transportation whereby the airplane can be used more efficiently and that the loading of the cargo-carrying body, which becomes a part of the cargo airplane, may be done at the loading station removed from the airplane itself. As the result of this arrangement, considerable rehandling of the goods, such as is necessary with the present day cargo airplanes, has been eliminated. While the carrying body has been described as one adapted for cargo, it should be understood that it could be one adapted to carry any load, such as passengers or gasoline, either for transport or for use by the airplane.

While various changes may be made in the detail construction, it shall be understood that such changes shall be within the spirit and scope of the present invention as defined by the appended claims.

I claim as my invention:

1. In a cargo airplane, a main fuselage section, a separable fuselage section constituting a cargo-carrying body, the exposed surfaces of said separable fuselage section in installed position presenting an unbroken contour continuous with the contour of said main fuselage section, side walls in said separable fuselage section having straight side terminal portions abutting said main fuselage section, said side terminal portions being substantially vertical and parallel to each other, side elements mounted on each of said side terminal portions for vertically slidable interengagement with complementary elements on said main fuselage section, bottom elements mounted on the bottom terminal portion of said separable fuselage section for abutting engagement with complementary elements on said main fuselage section, and locking elements mounted on the exposed top horizontal edges of said separable fuselage section for locking engagement with complementary elements on said main fuselage section.

2. In a cargo airplane, a main fuselage section, a separable fuselage section constituting a cargo-carrying and stress-carrying body, transverse stress-carrying bulkheads in said separable fuselage section, the exposed surfaces of said fuselage section in installed position presenting an unbroken contour continuous with the contour of said main fuselage section, side walls in said separable fuselage section having straight side terminal portions abutting said main fuselage section, said side terminal portions being substantially vertical and parallel to each other, side elements mounted on each of said side terminal portions for vertically slidable interengagement with complementary elements on said main fuselage section, bottom elements mounted on the bottom terminal portion of said separable fuselage section for abutting engagement with complementary elements on said main fuselage section, and locking elements mounted on the exposed top horizontal edges of said separable fuselage section for locking engagement with complementary elements on said main fuselage section.

3. In a cargo airplane, a main fuselage section, a separable fuselage section constituting a cargo-carrying and stress-carrying body, transverse stress-carrying bulkheads in said separable fuselage section, a stress-carrying skin on said separable section, the exposed surfaces of said separable fuselage section in installed position presenting an unbroken contour continuous with the contour of said main fuselage section, side walls in said separable fuselage section having straight terminal portions abutting said main fuselage section, said terminal portion being substantially vertical and parallel to each other, side elements mounted on each of said side terminal portions for vertically slidable interengagement with complementary elements on said main fuselage section, bottom elements mounted on the bottom terminal portion of said separable fuselage section for abutting engagement with complementary elements on said main fuselage section, and locking elements mounted on the exposed top horizontal edges of said separable fuselage section for locking engagement with complementary elements on said main fuselage section.

4. In a cargo airplane, a main fuselage section, a separable fuselage section constituting a cargo-carrying and stress-carrying body, the exposed surfaces of said separable fuselage section in installed position presenting an unbroken contour continuous with the contour of said main fuselage section, side walls in said separable fuselage section having straight terminal portions abutting said main fuselage section, said terminal portion being substantially vertical and parallel to each other, side elements mounted on each of said side terminal portions for vertically slidable interengagement with complementary elements on said main fuselage section, bottom elements mounted on the bottom terminal portion of said separable fuselage section for abutting engagement with complementary elements on said main fuselage section, a plurality of pins mounted adjacent the exposed horizontal edges of one of said fuselage sections, a plurality of pin-receiving sockets mounted adjacent the exposed horizontal edges of the other of said fuselage sections, and means carried by one of said fuselage sections for maintaining said pins and sockets in interlocking engagement.

HENRY T. NAGAMATSU.